United States Patent [19]

Iwatsuki et al.

[11] Patent Number: 5,101,687
[45] Date of Patent: Apr. 7, 1992

[54] SHIFT CONTROL SYSTEM AND METHOD USING A MAIN THROTTLE AND A SUB THROTTLE VALVE FOR TORQUE CONTROL FOR AUTOMATIC TRANSMISSIONS

[75] Inventors: Kunihiro Iwatsuki; Hiromichi Kimura, both of Toyota, Japan

[73] Assignee: Toyota Jidosha Kabushiki Kaisha, Toyota, Japan

[21] Appl. No.: 614,121

[22] Filed: Nov. 16, 1990

[30] Foreign Application Priority Data

Nov. 16, 1989 [JP] Japan .................. 1-297817

[51] Int. Cl.⁵ .................. F16H 39/14; F16H 61/04
[52] U.S. Cl. .................. 74/858; 74/866; 74/872; 364/424.1
[58] Field of Search .................. 74/872, 858, 866; 364/424.1

[56] References Cited

U.S. PATENT DOCUMENTS

| | | | |
|---|---|---|---|
| 4,266,447 | 5/1981 | Hees et al. | 74/858 |
| 4,355,550 | 10/1982 | Will et al. | 74/872 |
| 4,370,903 | 2/1983 | Stroh et al. | 74/851 |
| 4,403,527 | 9/1983 | Mohl et al. | 74/851 |
| 4,515,040 | 5/1985 | Takeuchi et al. | 74/866 |
| 4,589,302 | 5/1986 | Oda et al. | 74/866 |
| 4,627,311 | 12/1986 | Yokooku et al. | 74/866 |
| 4,677,880 | 7/1987 | Hatton et al. | 74/866 |
| 4,819,163 | 4/1989 | Shimizu et al. | 74/872 X |
| 4,819,187 | 4/1989 | Yasue et al. | 364/431.01 |
| 4,841,447 | 6/1989 | Hayashi et al. | 364/424.1 X |
| 4,868,753 | 9/1989 | Mori | 74/866 X |

*Primary Examiner*—Leslie A. Braun
*Assistant Examiner*—Khoi Q. Ta
*Attorney, Agent, or Firm*—Oblon, Spivak, McClelland, Maier & Neustadt

[57] ABSTRACT

A shift control system and method for an automatic transmission connected to an engine having engine intake controller includes a detector for detecting the start of an inertia phase at the time of a shift. An intake changing device outputs a first command signal for throttling the opening of the intake controller to such an extent that the engine torque is unvaried for a time period from the output of a command signal for the shift to the start of the inertia phase, and a second command signal for further throttling the opening of the intake controlling, simultaneously as the start of the inertia phase is detected, to drop the engine torque.

30 Claims, 5 Drawing Sheets

| OPENING OF MAIN THROTTLE VALVE θ | SUB-THROTTLE VALVE OPENING AT LOWER LIMIT OF ENGINE TORQUE CONSTANT REGION |
|---|---|
| 15 % | 30 % |
| 25 % | 40 % |
| 60 % | 50 % |
| 100 % | 50 % |

FIG.5

SHIFT CONTROL SYSTEM AND METHOD USING A MAIN THROTTLE AND A SUB THROTTLE VALVE FOR TORQUE CONTROL FOR AUTOMATIC TRANSMISSIONS

BACKGROUND OF THE INVENTION

The present invention relates to a shift control system for an automatic transmission, which is enabled at the time of a shift to drop the engine torque and accordingly the shift shocks by throttling the throttle valve of the engine.

There is already known widely in the prior art a shift control system for a vehicular automatic transmission, which is equipped with a gear shift assembly and a plurality of frictional engagement means so that the engagement of the frictional engagement means is selectively switched by actuating a hydraulic control system to achieve any of a plurality of speed changes.

There are also already proposed a variety of unitary control systems to be used with the automatic transmission and the engine, for controlling the engine torque to be reduced at the time of a shift. If the engine torque is reduced at the shift time, the energy absorption in each of the revolving members of the automatic transmission or the frictional engagement means for braking the members can be suppressed to complete the shift for a short time period and with small shift shocks.

Generally speaking, in case the engine torque is to be changed at the shift time, it is preferable to drop the engine torque while the revolving members of the automatic transmission have their rotational speed changing for the shift, if the shift is a power-on upshift (i.e., an upshift in the state having the accelerator depressed). Here, this time period will be called the "inertia phase". This is because the shift shocks might be increased if the changing timing of the engine torque extends the inertia phase. Since the detection of the inertia phase is not accurate if it is carried out by a timer, it is usually performed directly from a detection of the change in the revolutions of the revolving members.

Therefore, the engine torque control means is required to have an excellent responsiveness. The reason for this requirement will be described in the following. Generally speaking, the energy absorptivity in the frictional engagement means is maximized in the vicinity of the initial stage of the inertia phase. If a torque-down is instructed simultaneously as the inertia phase is detected, for example, it is not rapidly carried to a sufficient extent if the responsiveness of the torque-down means is poor. As a result, the reduction in the thermal load in the frictional engagement means is not fulfilled.

Incidentally, the torque-down means is exemplified by a technology for throttling an intake air flow rate, as disclosed in Japanese patent Laid-Open No. 58-174749. According to this technology, the torque-down can be performed frequently or for a long time. Another high merit obtainable is that a high torque reduction can be achieved. However, the means for driving the valve for throttling the intake air flow is restricted in capacity to have a poor responsiveness so that it is not actually adopted in the existing practice.

On the contrary, there is conventionally used a technology for controlling the torque change having excellent responsiveness, as exemplified by that (i.e., the ignition timing delay technology), which is used for delaying the ignition timing of the engine. However, this method is frequently followed by a gradual rise of the temperature of the exhaust system so that it cannot be used for a long-time or for frequent torque-down. Another problem is that a sufficiently high torque-down cannot be obtained.

SUMMARY OF THE INVENTION

A major object of the present invention is to provide a shift control system for an automatic transmission, which is enabled to reduce the engine torque with an excellent responsiveness so that the shift shocks can be reduced to improve the durability of the frictional engagement means.

Another object of the present invention is to provide a shift control method for an automatic transmission, which is enabled to reduce the engine torque with an excellent responsiveness so that the shift shocks can be reduced to improve the durability of the frictional engagement means.

In order to achieve the first-named object of the present invention, there is provided a shift control system for an automatic transmission connected to an engine having intake controlling means, which system comprises: detection means for detecting the start of an inertia phase at the time of a shift; and intake changing means for outputting: a first command signal for throttling the opening of the intake controlling means to such an extent that the engine torque is unvaried for a time period from the output of a command signal for the shift to the start of the inertia phase: and a second command signal for further throttling the opening of the intake controlling means, simultaneously as the start of the inertia phase is detected, to drop the engine torque.

In order to achieve the second-named object of the present invention, there is provided a shift control method for an automatic transmission connected to an engine having intake controlling means, which method comprises: a step of throttling the opening of the intake controlling means to such an extent as to leave the engine torque unvaried, at a predetermined instant after the output of a command signal for a shift and before the start of an inertia phase; a step of detecting the start of the inertia phase at the time of the shift; and a step of further throttling the opening of the intake controlling means simultaneously with the start of the inertia phase to drop the engine torque.

The above and further objects and novel features of the present invention will more fully appear from the following detailed description when the same is read in connection with the accompanying drawings. It is to be expressly understood, however, that the drawings are for the purpose of illustrations only and are not intended as a definition of the limits of the invention.

DETAILED DESCRIPTION OF THE PREFERRED EMBODIMENTS

Figure 1:
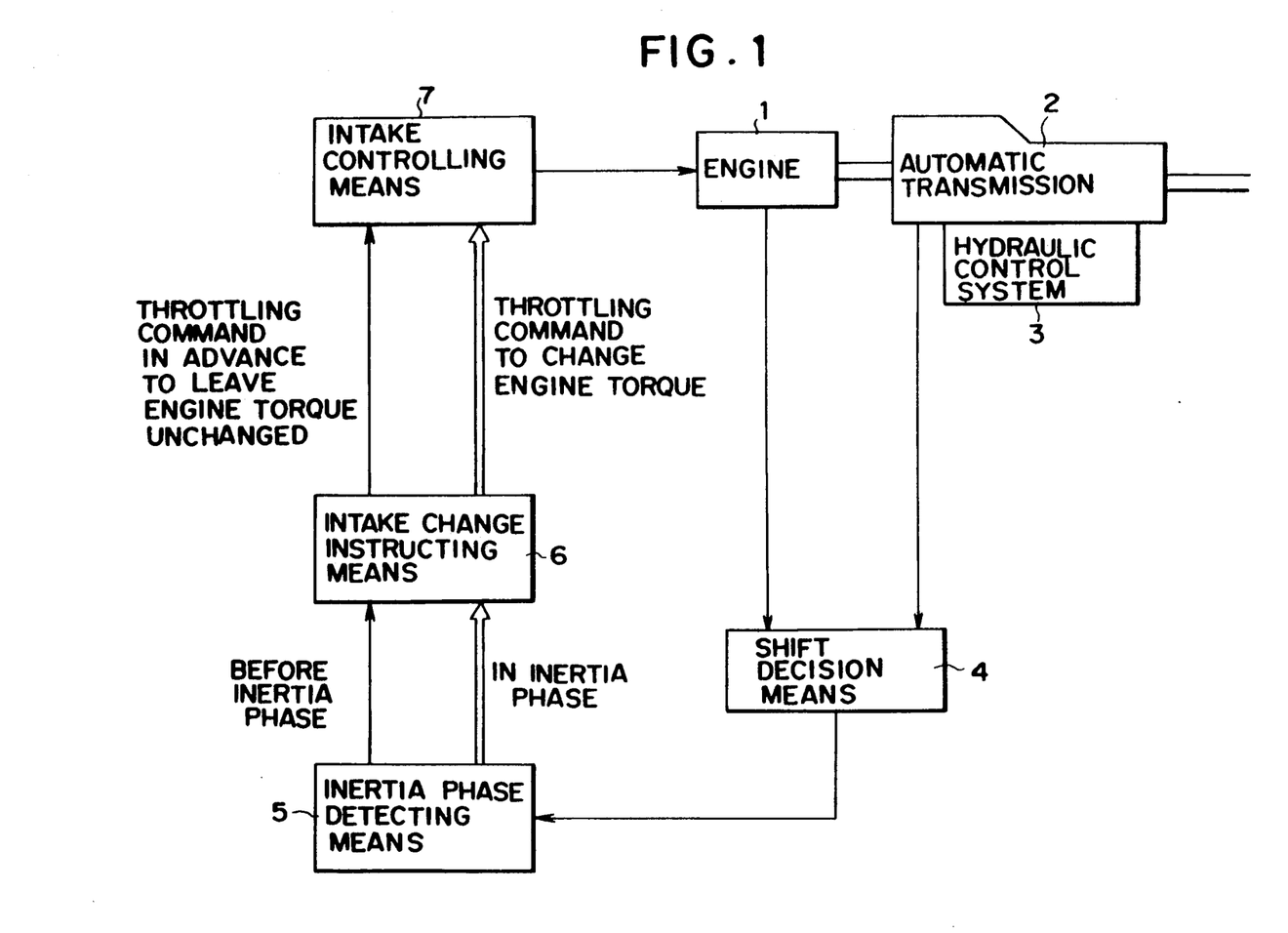
FIG. 1 is a block diagram showing the fundamental structure of one embodiment of the present invention.

Reference numeral 1 appearing in FIG. 1 designates an engine which is connected to an automatic transmission 2. This automatic transmission 2 is subjected to a plurality of speed stages by a hydraulic control system 3. Shift decision means 4 decides whether or not an upshift or a downshift is to be accomplished, on the basis of a vehicle speed determined from the rotational speed of the output shaft of the automatic transmission 2, the throttle opening of the engine 1 and so on, and outputs an upshift command signal or a downshift command signal. Inertia phase detecting means 5 detects that the state of the automatic transmission 2 comes into an inertia phase after a shift decision has been carried out, i.e., after the upshift or downshift command signal has been outputted, to output a signal on and before the start of the inertia phase, a signal indicating that the inertia phase has been started and a signal indicating a vicinity of the inertia phase end. Intake change instructing means 6 outputs a first command signal at a predetermined instant from the output of the upshift or downshift command signal to the start of the inertia phase and a second command signal simultaneously with the start of the inertia phase in upshift or at the vicinity of the inertia phase end in downshift. Intake controlling means 7 is provided for controlling the intake flow rate to the engine 1 and reduces the intake flow rate to an extent to leave the engine torque unchanged in response to the aforementioned first command signal and further the intake flow rate to drop the engine torque in response to the aforementioned second command signal.

Figure 2:
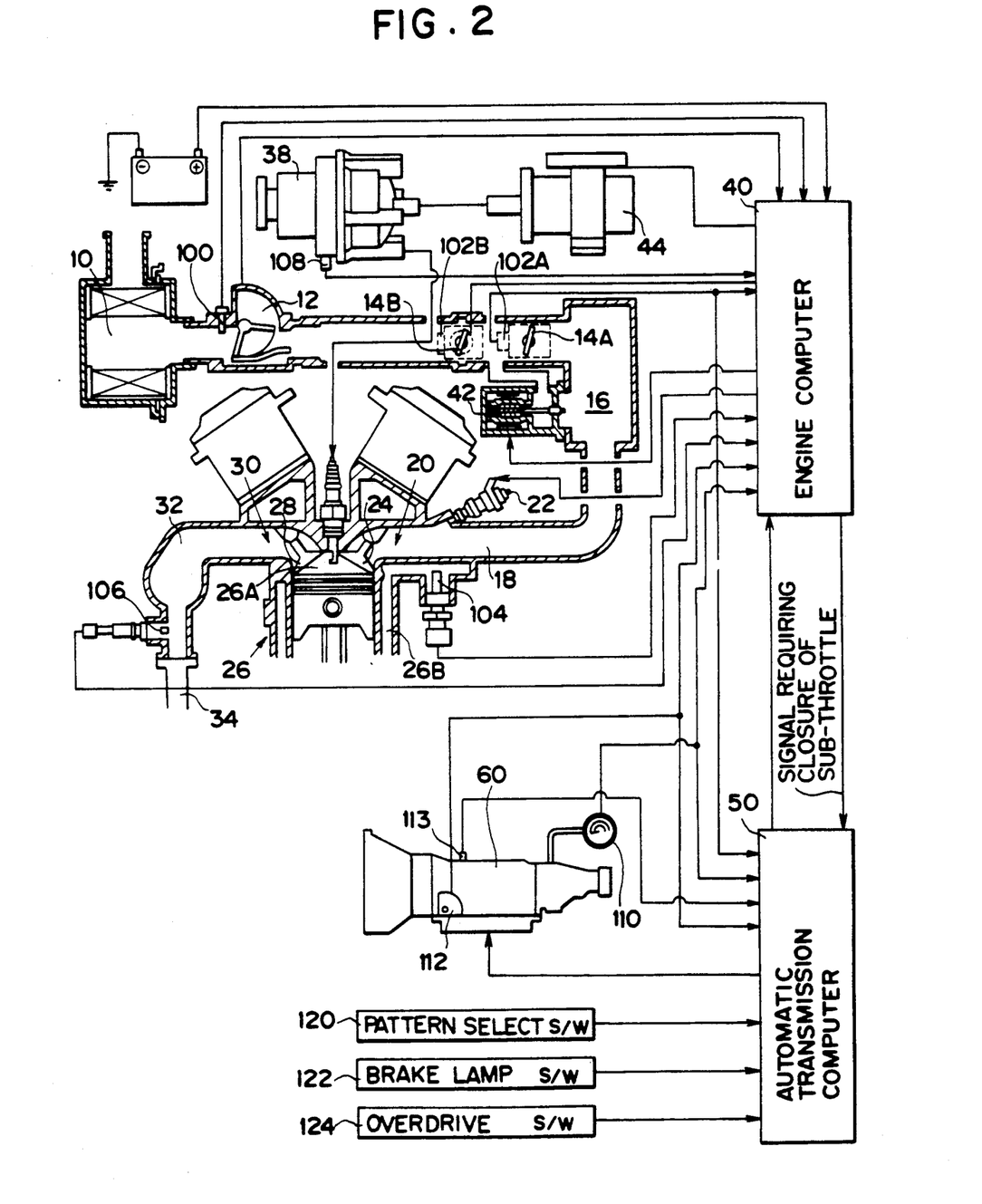
FIG. 2 is a schematic diagram showing the shift control system according to the present invention in a more specific form.

FIG. 2 is a schematic diagram showing the overall structure of the automatic transmission which is combined with an automative electronic fuel injection engine, to which is applied the present invention.

The air sucked from an air cleaner 10 is supplied to an air flow meter 12, a sub-throttle valve 14B, a main throttle valve 14A, a surge-tank 16 and an intake manifold 18 sequentially in the recited order. The air thus supplied is mixed in the vicinity of an intake port 20 with a fuel injected from an injector 22 so that the resultant mixture is further supplied through an intake valve 24 to the combustion chamber 26A of an engine body 26. The mixture is then burned in the combustion chamber 26A so that the resultant exhaust gases are discharged to the atmosphere through an exhaust valve 28, an exhaust port 30, an exhaust manifold 32 and an exhaust pipe 34.

The aforementioned air flow meter 12 is equipped with an intake temperature sensor 100 for detecting the temperature of the intake air. On the other hand, the exhaust manifold 32 is equipped with an $O_2$ sensor 106 for detecting the amount of the oxygen in the exhaust gases of the engine. The aforementioned main throttle valve 14A is pivoted in association with the not-shown accelerator pedal arranged near the driver's seat. The aforementioned sub-throttle valve 14B is provided for controlling the engine torque when the engine or the automatic transmission is to be controlled by an engine computer 40. These main throttle valve 14A and sub-throttle valve 14B are equipped with throttle sensors 102A and 102B for detecting their respective degrees of opening. On the other hand, the aforementioned engine body 26 has its cylinder block 26B equipped with a water temperature sensor 104 for detecting the temperature of the engine cooling water. Moreover, a distributor 38 has a shaft rotated by the crankshaft (although not shown) of the engine body 26 and is equipped with a crank angle sensor 108 for detecting the crank angle from the revolutions of its shaft thereby to detect the rotational speed of the engine. Moreover, an automatic transmission 60 is equipped with: a vehicle speed sensor 110 for detecting the vehicle speed from the rotational frequency of the output shaft (although not shown) thereof; a rotational speed sensor 113 for detecting the rotational speed NC0 of a C0 clutch (although not shown) or one of the revolving members of the automatic transmission 60; and a shift position sensor 112 for detecting the shift position.

Both the outputs of the aforementioned individual sensors 100, 102A, 102B, 104, 106, 108, 110, 112 and 113 and the outputs of a pattern select switch 120, an overdrive switch 124 and a brake lamp switch 122 are inputted to either the engine computer 40 or an automatic transmission computer 50. The engine computer 40 computes the fuel injection rate or the optimum ignition timing by using the input signals of the individual sensors as its parameters and produces outputs to control the aforementioned injector 22 so that the fuel may be injected only for a predetermined time period corresponding to said fuel injection rate and to control an ignition coil 44 so that the aforementioned optimum ignition timing may be established.

On the other hand, a bypass passage for providing the communication between the upstream of the main throttle valve 14A and the surge tank 16 is equipped with an idle rotational speed control valve 42 to be driven by a step motor, so that the idle rotational speed is controlled by the signal outputted from the aforementioned engine computer 40.

The automatic transmission in the present embodiment is caused to perform predetermined operations in accordance with a preset shift pattern, by the automatic transmission computer 50 which is receiving the signals of the throttle sensors 102A and 102B, the vehicle speed sensor 110, the rotational speed sensor 113 and so on. Thus, the not-shown S1 solenoid valve, S2 solenoid valve and S3 solenoid valve in the automatic transmission 60 are driven or controlled to engage or disengage the individual clutches and brakes so that the shift control is effected.

In the system thus constructed, the aforementioned engine computer 40 receives the shift data (e.g., the shift decision, the shift command or the permission of the engagement of a lockup clutch) from the aforementioned automatic transmission computer 50 to execute the engine torque control at the time of a shift by means of the aforementioned sub-throttle valve 14B.

Figure 3:
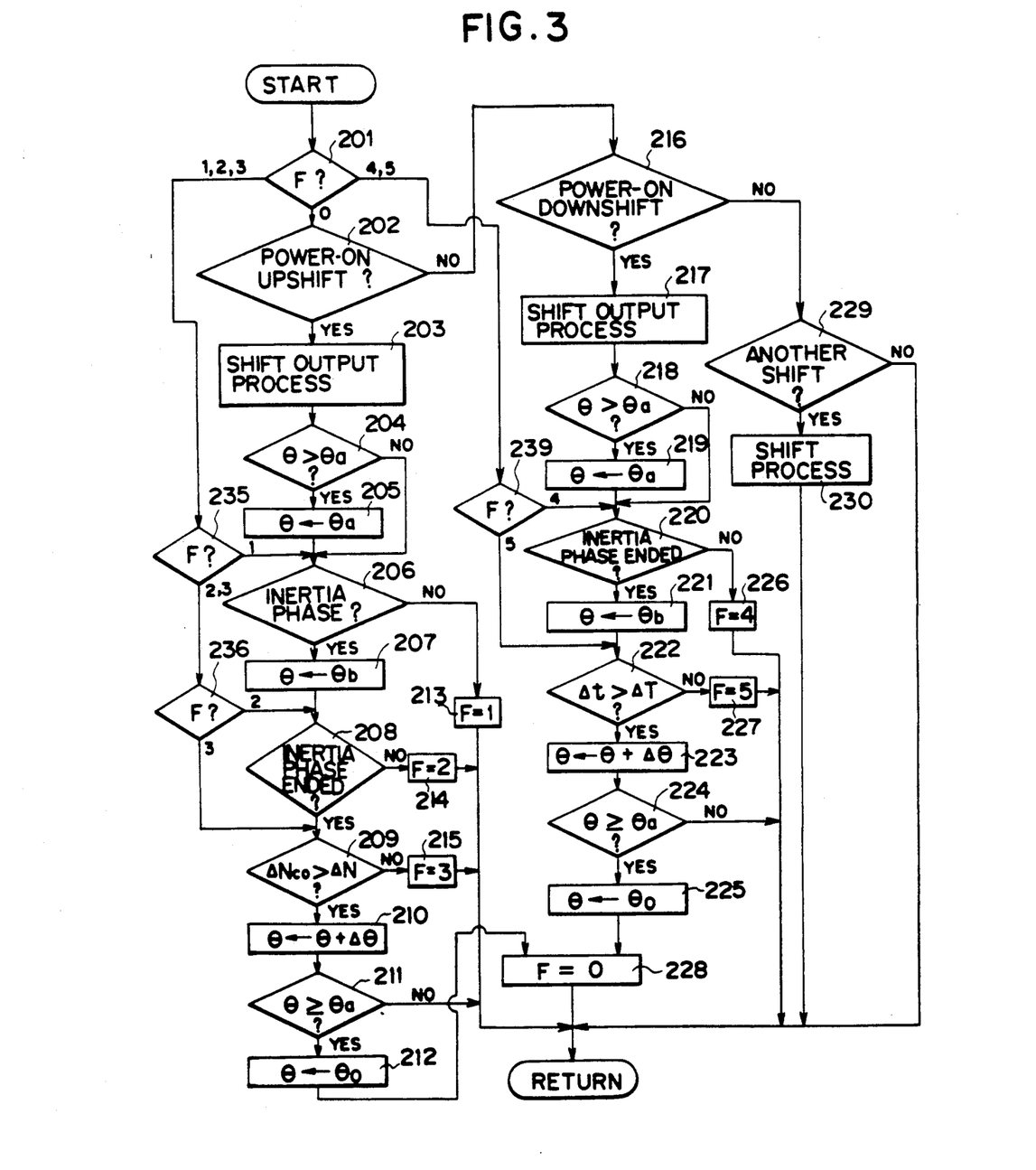
FIG. 3 is a flow chart showing a control procedure.

Next, a control flow chart used in the system of the present embodiment is shown in FIG. 3. Here is presented a control flow for an upshift and a downshift in the power-on state, in which the engine is driving the wheels.

The first description is directed to the power-on upshift, as indicated at Steps 201 to 212 and 228 in the control flow of FIG. 3.

Flag F at Step 201 is first detected for controlling the routine. Since the flag F is initially reset at 0, the routine advances to Step 202. This flag F functions mainly to store the state of the automatic transmission. If the flag F is at "0", the automatic transmission is in the initial or reset state; if the flag is at "1" (set at step 213), the automatic transmission is in the state before the start of the inertia phase in the power-on upshift; if at "2" (set at step 214), the automatic transmission is in the inertia phase in the power-on upshift; if at "3" (set at step 215), the automatic transmission is in the operation after the end of the inertia phase in the power-on upshift; if a "4" (set at step 226), the automatic transmission is in the inertia phase in the power-on downshift; and if at "5" (set at step 227), the automatic transmission is in operation after the end of the inertia phase in the power-on downshift.

At Step 202, it is decided whether or not the shift of the power-on upshift has been decided. If YES, the routing advances to Step 203, at which the shift output process is carried out.

Figure 4A:
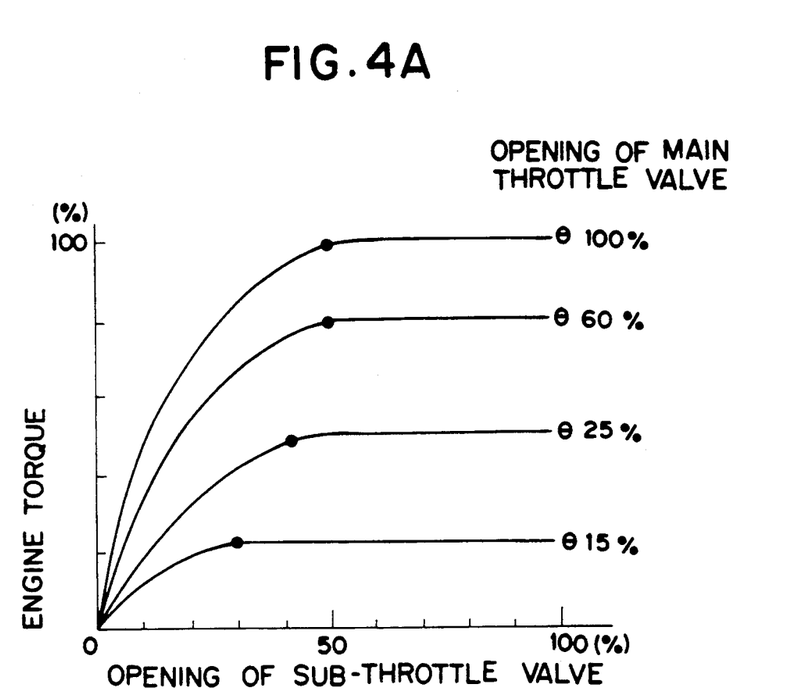
FIG. 4(A) is a graph plotting the engine torque against the sub-throttle valve opening $\theta$.

Here, FIG. 4(A) is a graph plotting the engine torque against the degree of opening $\theta$ of the aforementioned sub-throttle valve 14B. It is found from this graph that the degree of change of the engine torque against the change in the sub-throttle valve opening $\theta$ is influenced by a main throttle valve opening $\Theta$. In case the main throttle valve opening $\Theta$ is 15%, the engine torque is constant in the range of the sub-throttle valve opening $\theta$ from 30% to 100%. In case the main throttle valve opening $\Theta$ is 25%, the engine torque is constant in the range of the sub-throttle valve opening $\theta$ from 40% to 100%. In case the main throttle valve opening $\Theta$ is 60% and 100%, the engine torque is constant in the range of the sub-throttle valve opening $\theta$ from 50% to 100%. These relations are enumerated in Table of FIG. 4(B).

When, therefore, the engine torque in the inertia phase is to be reduced, the sub-throttle valve opening $\theta$ can be closed so as to be no less than 30% open in advance (an initial degree of operation) before the start of the inertia phase without reducing the engine torque if the main throttle valve opening $\Theta$ is 15%. As a result, the engine torque can be reduced with improved responsiveness, as soon as the sub-throttle valve 14B is further closed even a little (a further degree of operation) simultaneously with the start of the threshold inertia phase.

Specifically, it is decided at Step 204 whether or not the sub-throttle opening $\theta$ is larger than the sub-throttle valve opening $\theta$ a at the lower limit of the aforementioned engine torque constant range. If it is decided that the sub-throttle valve opening $\theta$ is larger than the value $\theta$ a, the sub-throttle valve opening $\theta$ is reduced to the value $\theta$ a at Step 205. As a result, there can be prepared a state in which the engine torque is reduced as soon as the sub-throttle valve opening $\theta$ is reduced even a little.

AFter the sub-throttle valve 14B has been throttled to the lower limit throttle valve opening $\theta$ a of the aforementioned engine torque constant range, it is decided at Step 206 whether or not the state of the automatic transmission has come into the state of starting the inertia phase. This decision is effected by confirming whether or not the following relation holds:

$$NC0 < N0 \times pL - \alpha.$$

Wherein: NC0 designates the rotational speed of the aforementioned C0 clutch; N0 designates the rotational speed of the output shaft of the automatic transmission; $\eta$ L designates a gear ratio at a lower speed stage (e.g., the 2nd speed in case of a shift from the 2nd speed to the 3rd speed); and $\alpha$ designates a positive constant.

In case the automatic transmission is decided to be in the inertia phase starting state, the routine advances to Step 207. Inherent in this step is the requirement to determine the appropriate value of $\theta_a$, for example, by use of the table of FIG. 4B stored as a map in a portion of the intake change instructing means 6, which portion thus constitutes a means for determining a value of the intake opening of the engine above which an engine torque is substantially unvaried and below which the engine torque begins to substantially drop (i.e., means for determining the initial degree of operation during which a value of engine torque is not substantially affected). At Step 207, the sub-throttle valve 14B, which has been throttled to the opening $\theta$ a, is further throttled to a predetermined sub-throttle valve opening $\theta$ b. As a result, the engine torque rapidly starts to drop so that the thermal load upon the frictional elements can be effectively reduced at the inertia phase starting instant in which the energy absorptivity of the frictional elements is maximized.

At Step 208, it is decided whether or not the inertia phase has reached the vicinity of the end. This decision is carried out by confirming whether or not the following relation holds:

$$NC0 < N0 \times pH - \beta,$$

wherein: $p$ H designates a gear ratio of a higher speed side (e.g., the 3rd speed in case of a shift from the 2nd speed to the 3rd speed); and $\beta$ designates a positive constant.

If it is decided that the automatic transmission has come into a state near the end of the inertia phase, it is decided at Step 209 whether or not the reduction $\Delta$ NC0 in the rotational speed of the C0 clutch is larger than a predetermined rotational speed reduction $\Delta$ N. At step 210, the sub-throttle valve 14B in the throttled state is restored by $\Delta$ $\theta$ for each rotational speed reduction $\Delta$ N. Thus, the engine torque is gradually restored in synchronism with the extent of the reduction in the rotational frequency NC0 of C0 clutch. Here, this restoration is performed such that the end (at which the rotational frequency NC0 of the C0 clutch takes the value of N0 $\times$ $p$ H) of the inertia phase is timed with the instant at which the sub-throttle valve opening $\theta$ returns the lower limit opening $\theta$ a.

At Step 211, it is decided whether or not the sub-throttle valve opening $\theta$ thus being gradually opened exceeds the sub-throttle valve opening $\theta$ a at the lower limit of the aforementioned engine torque constant range. When the sub-throttle valve opening $\theta$ exceeds the value $\theta$ a, the routine advances to Step 212, at which the sub-throttle valve opening $\theta$ is increased to the final sub-throttle valve opening $\theta$ 0 (or to the full opening in case of no other specific control). After this, the flag F is set to zero at Step 228, and the routine is returned.

Next, the power-on downshift will be described in the following in connection with the control flow chart of FIG. 3, as indicated mainly at Steps 201 and 202 and Steps 216 to 228.

After a shift output processing at Step 217, it is decided at Step 218 whether or not the sub-throttle valve opening $\theta$ exceeds the aforementioned opening $\theta$ a. If it is decided that the sub-throttle valve opening $\theta$ exceeds the value $\theta$ a, the sub-throttle valve opening $\theta$ is reduced at Step 219 to the opening $\theta$ a at the lower limit of the aforementioned engine torque constant range. As a result, the condition for reducing the engine torque arises as soon as the sub-throttle valve opening $\theta$ is reduced even slightly.

At Step 220, it is decided whether or not the automatic transmission has come close to the end of the inertia phase. This decision is carried out by confirming whether or not the following relation holds:

$$NC0 < N \times \rho L - \beta.$$

When the vicinity of the inertia phase end is detected, the sub-throttle valve opening $\theta$ is reduced from the state $\theta$ a to the predetermined opening $\theta$ b (at Step 221). After this, the sub-throttle valve opening $\theta$ is gradually increased by $\Delta \theta$ at a time interval of $\Delta T$ (at Steps 222 and 223). When the sub-throttle valve opening $\theta$ exceeds the opening $\theta$ a at the lower limit of the aforementioned engine torque constant range (at Step 224), the sub-throttle valve opening $\theta$ is released to the final sub-throttle valve opening $\theta$ 0 (or to the fully open state in case of no other specific control).

After this, at Step 228, the flag F for controlling the routine is set to "0" for the initialization.

Here, it is decided at Step 229 whether or not there is any shift decision other than the power-on upshift and the power-on downshift. If YES, a corresponding shift processing is performed at Step 230. Otherwise, the routine is returned as it is, and the series of processings are ended.

Figure 5:
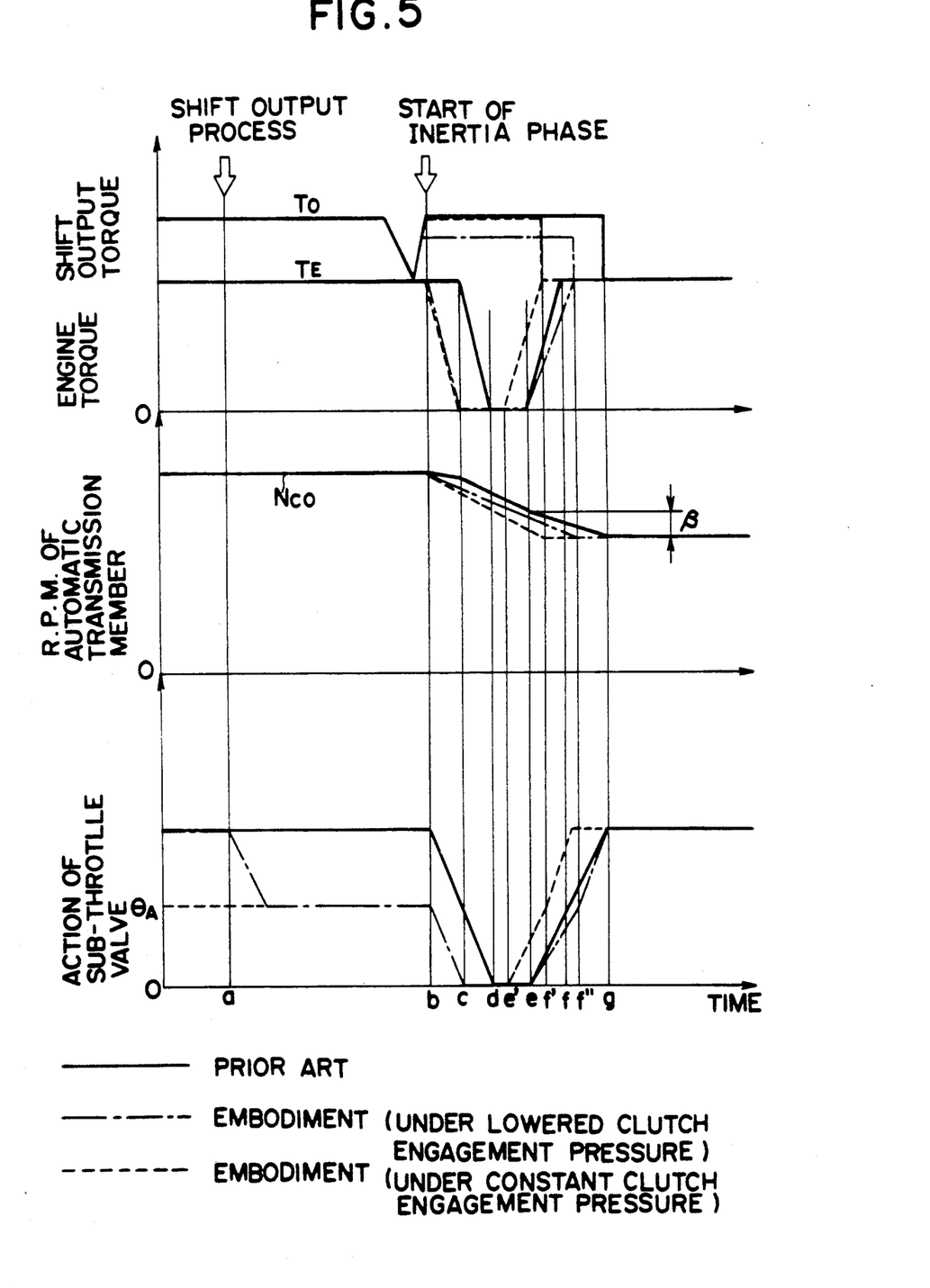
FIG. 5 is a graph plotting the output shaft torque of the automatic transmission, the engine torque, the rotational frequency of a predetermined revolving member of the automatic transmission, and the opening of the sub-throttle valve all against the time for an upshift from 2nd to 3rd speeds with the throttle valve being fully open.

FIG. 5 is a graph plotting the output shaft torque, the engine torque, the rotational speed of the C0 clutch of the automatic transmission, and the action of the sub-throttle valve all against the time, in case of an upshift from the 2nd to 3rd speeds of the shift control of the automatic transmission thus far described in the system of the present embodiment, with the accelerator pedal being fully open.

In the graph of FIG. 5: solid lines correspond to the case of the control system of the prior art; chain lines correspond to the case, in which the control system of the present embodiment is used under a lowered clutch engagement pressure; and dash lines correspond to the case in which the control system of the present embodiment is used under a constant clutch engagement pressure.

In FIG. 5, the timing for the shift output processing for the shift decision is located at point a, and the timing for starting the inertia phase is located at point b. Since, in the system of the prior art, the sub-throttle valve 14B has a response delay, it is not fully closed till point d, even if a throttle fully closing command is issued as soon as the inertia phase is detected at point b. Since, moreover, the engine torque is substantially unvaried till point c (which corresponds to a throttle opening of about 50%), its reduction is not started till point c. In the range from point b to point c, the frictional elements have high relative revolving speeds to that their energy absorptivities are remarkably high. If, therefore, the torque cannot be reduced in that range, the intrinsic effect of the engine torque-down is seriously reduced. On the other hand, the torque restoration starts from point e. If, however, the sub-throttle valve is to be restored to its fully open state, for example, in response to the reduction in the rotational frequency NC0 of the C0 clutch so as to improve the accuracy of the synchronization between the end timing of the inertia phase and the complete restoration timing of the engine torque, the energy absorption of the frictional engagement means is increased to delay the shift to point g because the engine torque is substantially restored at point f. According to the present embodiment, on the contrary, the sub-throttle valve opening $\theta$ is reduced to about 50% at point a simultaneously with the shift output so that the reduction in the engine torque is rapidly started simultaneously with the closing command of the sub-throttle valve at point b. If, therefore, a constant clutch oil pressure is set (as indicated by the dash lines), the shift is ended at point e so that the thermal load upon the clutch is remarkably reduced. In case, therefore, the clutch engagement pressure is reduced to an extent corresponding to the reduction in the thermal load, the characteristics obtained are so excellent as to produce little change in the output shaft torque, as indicated by the chain lines, so that the shift shocks are reduced.

Since the region (with a sub-throttle valve opening of 0 to 50%, for example), in which the engine torque is substantially changed is made to correspond to the change $\Delta$ NC0 of the rotational speed of the C0 clutch, the end of the inertia phase and the complete restoration of the engine torque can be accurately timed to provide the excellent characteristics which are freed from any elongated time required for the shift and any drop in the torque after the shift.

As has been described hereinbefore, according to the present invention, it is possible to improve low responsiveness which has been the demerit of the method of throttling the throttle valve as a method for changing the engine torque. As a result, it is possible to fulfill the intrinsic effects obtainable by changing the engine torque, such as the improvement in the durability of the frictional engagement means or the reduction in the shift shocks, without being followed by the defects such as the temperature rise in the exhaust system, which are caused when the engine torque is changed by delaying the ignition advance angle, for example.

What is claimed is:

1. A shift control system for an automatic transmission connected to an engine having intake controlling means for varying an intake opening of the engine comprising;

upshift decision means for deciding an upshift;

output means for outputting an upshift command signal when the upshift is decided;

detecting means for detecting a start of an inertia phase at a time of the upshift; and intake changing means for determining a value of the intake opening of the engine above which an engine torque is substantially unvaried and below which the engine torque begins to substantially drop, for outputting a first command signal to said intake controlling means at a predetermined instant from the output of the upshift command signal to the start of the inerita phase for throttling the intake opening to said value for a time period from the output of the first command signal for the shift to the start of the inertia phase, and a second command signal to said intake controlling means simultaneously as the start of the inertia phase is detected for further throttling the intake opening to reduce the engine torque.

2. A shift control system for an automatic transmission, according to claim 1, wherein said intake controlling means includes a main throttle valve and a sub-throttle valve disposed upstream of said main throttle valve in respect to a direction of intake air flow, and wherein said first and second command signals from said intake changing means act upon a degree of opening of said sub-throttle valve.

3. A shift control system for an automatic transmission, according to claim 2, wherein a lower value of the opening of said sub-throttle valve resulting from said first command signal is determined in accordance with a degree of opening of said main throttle valve.

4. A shift control system for an automatic transmission, according to claim 1, wherein said automatic transmission includes a plurality of revolving members and an output shaft, and wherein said detecting means includes a first rotational speed sensor for detecting the rotational speed of any said revolving members and a second rotational speed sensor for detecting the rotational speed of said output shaft.

5. A shift control system for an automatic transmission, according to claim 1, wherein the predetermined instant is a time when the upshift command signal is outputted.

6. A shift control system for an automatic transmission connected to an engine having intake controlling means for varying an intake opening of the engine, comprising:

downshift decision means for deciding a downshift;

output means for outputting a downshift command signal when the downshift is decided;

detecting means for detecting a vicinity of an inertia phase end at a time of the downshift; and intake changing means for determining a value of the intake opening of the engine above which an engine torque is substantially unvaried and below which the engine torque begins to substantially drop, for outputting a first command signal to said intake controlling means at a predetermined instant from the output of the downshift command signal to the vicinity of the inertia phase end for throttling the intake opening to said value for a time period from the output of the first command signal for the shift to the vicinity of the inertia phase end, and a second command signal to said intake controlling means at the vicinity of the inertia phase end for further throttling the intake opening to reduce the engine torque.

7. A shift control system for an automatic transmission, according to claim 6, wherein said take controlling means includes a main throttle valve and a sub-throttle valve disposed upstream of said main throttle valve in respect to a direction of intake air flow, and wherein said first and second command signal from said intake changing means act upon a degree of opening of said sub-throttle valve.

8. A shift control system for an automatic transmission, according to claim 7, wherein a lower value of the opening of said sub-throttle valve resulting said first command signal is determined in accordance with a degree of opening of said main throttle valve.

9. A shift control system for an automatic transmission, according to claim 6, wherein said automatic transmission includes a plurality of revolving members and an output shaft, and wherein said detecting means includes a first rotational speed sensor for detecting the rotational speed of any of said revolving members and a second rotational speed sensor for detecting the rotational speed of said output shaft.

10. A shift control system for an automatic transmission, according to claim 6, wherein the predetermined instant is a time when the downshift command signal is outputted.

11. A shift control method for an automatic transmission connected to an engine having intake controlling means for varying an intake opening of the engine, comprising:

a first step of deciding an upshift;

a second step of outputting an upshift command signal when the upshift is decided;

a third step of throttling an intake opening to such an extent as to leave an engine torque substantially unvaried at the same time of an output of the upshift command or at a predetermined instant after the output of the upshift command signal and before a start of an inerita phase;

a fourth step of detecting the start of the inertia phase at a time of the upshift; and a fifth step of further throttling the opening of said intake controlling means simultaneously with the start of the inertia phase to reduce the engine torque.

12. A shift control method for an automactic transmission, according to claim 11, wherein said intake controlling means includes a main throttle valve and a sub-throttle valve disposed upstream of said main throttle valve in respect to a direction of intake air flow, and wherein said third step throttles said sub-throttle valve to such an extent as to leave the engine torque unvaried.

13. A shift control method for an automatic transmission, according to claim 12, wherein a lower limit of the opening of said sub-throttle vlave resulting from said first command signal is determined in accordance with a degree of opening of said main throttle valve.

14. A shift control method for an automatic transmission, according to claim 11, wherein said fourth step detects the start of the inertia phase on the basis of both rotational speed of any of revolving members of said automatic transmission and rotational speed of an output shaft of said automatic transmission.

15. A shift control method for an automatic transmission, according to claim 11, further comprising:

a sixth step of detecting that an instant of ending the inertia phase is approaching; and a seventh step of increasing the intake opening controlled by said intake controlling means gradually to augment the engine torque.

16. A shift control method for an automatic transmission, according to claim 15, wherein said seventh step opens said intake opening controlled by said intake controlling means by a constant opening in accordance with a change in rotational speed of any of revolving members of said automatic transmission.

17. A shift control method for an automatic transmission, according to claim 15,
    wherein said intake controlling means includes a main throttle valve and a sub-throttle valve disposed upstream of said main throttle valve in respect to a direction of intake air flow, and
    wherein said seventh step augments a value of the opening of said sub-throttle valve gradually without changing a value of the opening of said main throttle valve.

18. A shift control method for an automatic transmission, according to claim 17,
    wherein said seventh step opens said sub-throttle valve stepwise by a constant degree in accordance with a change in the rotational speed of any of the revolving members of said automatic transmission to a predetermined opening determined according to a value of the opening of said main throttle valve.

19. A shift control method for an automatic transmission, according to claim 18,
    wherein the predetermined opening according to a value of the opening of said throttle valve is such that the engine torque is not changed even if said sub-throttle valve is opened to an extent exceeding said predetermined opening.

20. A shift control method for an automatic transmission, according to claim 15,
    wherein said sixth step is carried out by an arithmetic computation based on both the rotational speed of any of the revolving members of said automatic transmission and the rotational speed of the output shaft of said automatic transmission.

21. A shift control method for an automatic transmission, according to claim 19, further comprising :
    an eighth step of augmenting the opening of said sub-throttle valve over said predetermined opening.

22. A shift control method for an automatic transmission connected to an engine having intake controlling means for varying an intake opening of the engine, comprising:
    a first step of deciding a downshift;
    a second step of outputting a downshift command signal when the downshift is decided;
    a third step of throttling an intake opening to such an extent as to leave an engine torque substantially unvaried at the same time of an output of the downshift command or at a predetermined instant after the output of the downshift command signal and before a vicinity of an inertia phase end;
    a fourth step of detecting the vicinity of the inertia phase end at a time of the downshift; and
    a fifth step of further throttling the opening of said intake controlling means on or after detecting the vicinity of the inertia phase end to reduce the engine torque.

23. A shift control method for an automatic transmission, according to claim 22,
    wherein said intake controlling means includes a main throttle valve and a sub-throttle valve disposed upstream of said main throttle valve in respect to a direction of intake air flow, and
    wherein said third step throttles said sub-throttle valve to such an extent as to leave the engine torque unvaried.

24. A shift control method for an automatic transmission, according to claim 23,
    wherein a lower limit of the opening of said sub-throttle valve resulting from said first command signal is determined in accordance with a degree of opening of said main throttle valve.

25. A shift control method for an automatic transmission, according to claim 22,
    wherein said fourth step detects the vicinity of the inertia phase end on the basis of both rotational speed of any of revolving members of said automatic transmission and rotational speed of an output shaft of said automatic transmission.

26. A shift control method for an automatic transmission, according to claim 22, further comprising:
    a sixth step of augmenting the intake opening controlled by said intake controlling means at a time after throttling to a predetermined lower limit.

27. A shift control method for an automatic transmission, according to claim 26,
    wherein said sixth step opens said intake opening controlled by said intake controlling means stepwise by a constant opening at a constant time.

28. A shift control method for an automatic transmission, according to claim 26,
    wherein said intake controlling means includes a main throttle valve and a sub-throttle valve disposed upstream of said main throttle valve in respect to a direction of intake air flow, and
    wherein said sixth step augments a valve of the opening of said sub-throttle valve gradually without changing a value of the opening of said main throttle valve.

29. A shift control method for an automatic transmission, according to claim 28, further comprising :
    a seventh step of augmenting the opening of said sub-throttle valve over said predetermined opening.

30. A shift control method for an automatic transmission, according to claim 27,
    wherein said intake controlling means includes a main throttle valve and a sub-throttle valve disposed upstream of said main throttle valve in respect to a direction of intake air flow, and
    wherein said sixth step opens said sub-throttle valve stepwise by a constant opening amount at a constant time to a predetermined opening which is determined according to a value of the opening of said main throttle valve.

* * * * *

UNITED STATES PATENT AND TRADEMARK OFFICE
CERTIFICATE OF CORRECTION

PATENT NO. : 5,101,687

DATED : 04/07/92

INVENTOR(S) : IWATSUKI ET AL

It is certified that error appears in the above-identified patent and that said Letters Patent is hereby corrected as shown below:

Column 1, line 40, change "detection" to --direction--.

Figure 4B:
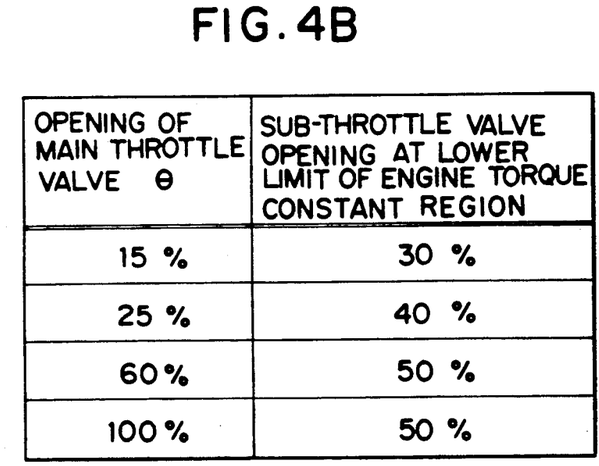
FIG. 4(B) is a table enumerating the relations between the lower limit $\theta$ a of the sub-throttle valve and the main throttle valve opening $\Theta$ for no change of the engine torque.

Column 5, line 18, change "routing" to --routine--;

line 44, delete "threshold";

line 47, after "the" (second occurrence) insert --threshold--;

line 49, before "If" insert --Inherent in this step is the requirement to determine the appropriate value of $\theta$ a, for example, by use of the table of Figure 4B stored as a map in a portion of the intake change instructing means 6, which portion thus constitutes a means for determining a value of the intake opening of the engine above which an engine torque is substantially unvaried and below which the engine torque begins to substantially drop (i.e., means for determining the initial degree of operation during which a value of engine torque is not substantially affected).-- line 68, change "$\eta$" to --$\rho$--.

UNITED STATES PATENT AND TRADEMARK OFFICE
CERTIFICATE OF CORRECTION

PATENT NO. : 5,101,687
DATED : 04/07/92
INVENTOR(S) : IWATSUKI ET AL

It is certified that error appears in the above-identified patent and that said Letters Patent is hereby corrected as shown below:

Column 6, lines 5-15, delete "Inherent in this step is the requirement to determine the appropriate value of $\theta$ a, for example, by use of the table of Figure 4B stored as a map in a portion of the intake change instructing means 6, which portion thus constitutes a means for determining a value of the intake opening of the engine above which an engine torque is substantially unvaried and below which the engine torque begins to substantially drop (i.e., means for determining the initial degree of operation during which a value of engine torque is not substantially affected).--

Column 7, line 9, change "N" to --NO--.

UNITED STATES PATENT AND TRADEMARK OFFICE
CERTIFICATE OF CORRECTION

PATENT NO. : 5,101,687
DATED : April 7, 1992
INVENTOR(S) : Iwatsuki, et. al.

It is certified that error appears in the above-indentified patent and that said Letters Patent is hereby corrected as shown below:

Column 8, line 27, after "improve" insert --the--.

Signed and Sealed this

Seventh Day of September, 1993

*Attest:*

BRUCE LEHMAN

*Attesting Officer*     *Commissioner of Patents and Trademarks*